UNITED STATES PATENT OFFICE.

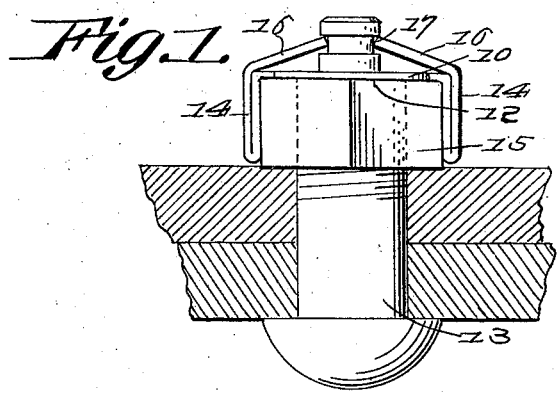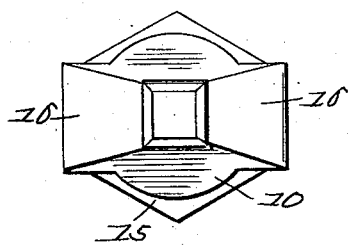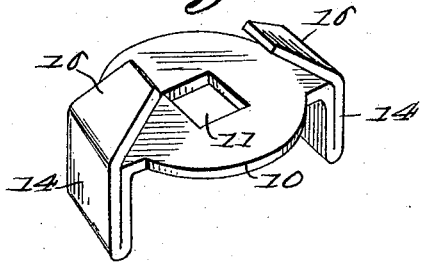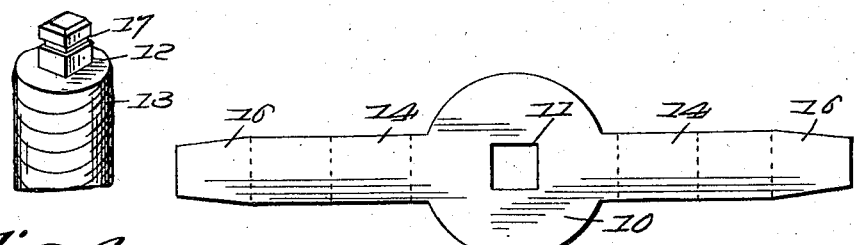

JESSIE ERNEST JONES AND JOE LEE GOODNOUGH, OF GREENVILLE, SOUTH CAROLINA.

NUT LOCK.

1,414,188.  Specification of Letters Patent. Patented Apr. 25, 1922.

Application filed May 20, 1921. Serial No. 471,107.

*To all whom it may concern:*

Be it known that we, JESSIE E. JONES and JOE L. GOODNOUGH, citizens of the United States of America, residing at Greenville, in the county of Greenville and State of South Carolina, have invented new and useful Improvements in Nut Locks, of which the following is a specification.

The object of the invention is to provide a simple, inexpensive and efficient nut lock adapted for use in connection with bolts employed on machinery, railway track rails and in similar capacities where the bolt is subjected to vibration or jarring tending to loosen the bolt, and it is a particular object of the invention to provide a locking device which when required may be disengaged to release the nut without mutilation of either the locking device, the nut or the bolt, to permit of replacement or further use thereof; and with these objects in view the invention consists in a construction and combination of parts of which a preferred embodiment is shown in the accompanying drawings, wherein:

Figure 1 is a side view of a nut lock embodying the invention applied in the operative position to a bolt and nut.

Figure 2 is an end view of the same.

Figure 3 is a detail view of the locking device detached.

Figure 4 is a similar view of the bolt of which the end is modified for engagement by the locking device.

Figure 5 is a plan view of the block from which the locking device is formed.

The lock consists of a washer member 10 provided with a square or angular or otherwise irregular opening 11 for engagement with a seat 12 of corresponding cross sectional contour formed on the extremity of the bolt 13 which otherwise may be of the ordinary or any preferred construction, fingers 14 which are preferably cross sectionally flat for engagement respectively with diametrically opposite flat side faces of the nut 15, and yielding tongues 16 springing from the plane of the washer member at diametrically opposite points and having their terminals engaged in grooves 17 formed in the reduced cross sectionally angular terminal of the bolt and adapted by inward pressure applied to the extremity thereof to be forced into said grooves or under shoulders constituting the upper walls of said grooves, to exert an inward spring action upon the washer member and thus maintain the fingers in proper engaged relation with the opposite side faces of the nut.

In practice it is preferred to construct the lock of a single blank of plate metal with the washer member representing the central portion of the blank from which radially extend arms doubled upon themselves and bent at an angle to the plane of the washer member to form the fingers, with the extremities of the arms constituting the yielding tongues which terminally engage the shoulders at the extremity of the reduced terminal portion of the bolt.

The device may be detached from the nut and bolt by inserting a relatively thin tool such as a screw driver, wedge or the like between the free inner ends of the tongues and the plane of the washer member and springing said tongues outward to disengage their extremities from the shoulders of the bolt. In applying the device to the bolt it is only necessary to fit the fingers over the opposite sides of the nut with the opening in the washer plate in registration with the cross sectionally angular end of the bolt and then force the device inward or longitudinally of the bolt until the extremities of the tongues snap under the shoulders at the terminal of the bolt.

Having described the invention, what is claimed as new and useful is:—

1. A nut locking device having a washer member provided with inwardly extending fingers for engaging diametrically opposite side surfaces of a nut and provided with an opening of irregular contour for receiving a correspondingly shaped end portion of the bolt, and yielding fingers carried by the washer plate for terminal engagement with diametrically opposite shoulders on the projecting bolt end.

2. A nut locking device having in combination with a bolt provided with a cross sectionally angular reduced terminal, a washer plate having an opening to receive said terminal of the bolt and provided with fingers for engaging opposite flat side surfaces of the nut, and yielding tongues for terminal engagement with shoulders near the extremity of the bolt end.

3. A nut locking device consisting of a blank of metal having a central washer member provided with a central irregular opening and arms folded upon themselves to provide inwardly extending nut engaging fingers, the extremities of said arms being disposed in outwardly convergent relation for terminal engagement with opposite sides of a bolt.

In testimony whereof they affix their signatures.

JESSIE ERNEST JONES.
JOE LEE GOODNOUGH.